May 8, 1962   A. B. RAYON   3,034,082
GROUND CLAMP FOR ELECTRIC WELDER
Filed Feb. 26, 1960

Andrus B. Rayon
INVENTOR.

BY *Clarence A. O'Brien*
*and Harvey B. Jacobson*
Attorneys

3,034,082
GROUND CLAMP FOR ELECTRIC WELDER
Andrus B. Rayon, 3748 Rachel Ave., Port Arthur, Tex.
Filed Feb. 26, 1960, Ser. No. 11,214
1 Claim. (Cl. 339—8)

This invention relates to ground clamps and more particularly to a ground clamp especially designed for use in connection with equipment or situations wherein a good electrical ground is necssary.

An object of the invention is to provide a very dependable and effective ground clamp asembly particularly useful in connection with electrical welders and which will allow the clamp portion and the work engaged therein to be rotated a full 360° without transferring any appreciable amount of torque to the ground wire of the electrical welder connected to the ground clamp assembly.

The clamp is made of a clamp housing containing mercury and a binding post or bolt with which an electrical conductor may be secured. A packing is contained in the housing, and there is a stud rotationally mounted through a passage way in the packing with the inner end of the stud in contact with the mercury. The outer end of the stud is on the exterior of the housing and contains any type of clip or clamping device to engage the work. For instance, a C-clamp may be used for this purpose, a magnet, a heavy duty alligator clip, etc. Principally, the ground clamp achieves the result of avoiding the difficulties encountered when the welding cable becomes wound around the work during the normal use of hand welders or other welding machines. Further, when the cable winds around and becomes entangled in this way, there is a tendency in the use of ordinary ground clamps, for the ground clamp to become loose and lose the ground connection which is absolutely essential for proper welding. Further, entangling of the cable around pipe or other work pieces creates a poor working condition which leads to accidents.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
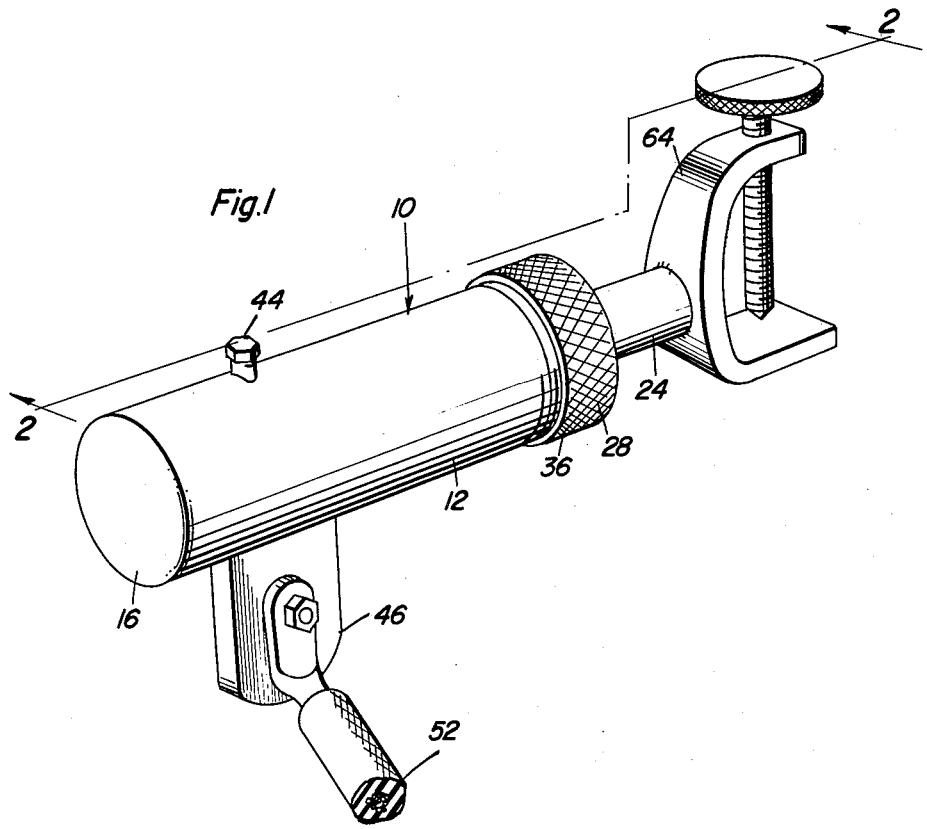
FIGURE 1 is a perspective view of a ground clamp in accordance with the invention.

In the accompanying drawing there is an illustration of a ground claimp 10 which exemplifies the principles of the invention. It is to be clearly understood at the outset that the ground clamp 10 may be used in connection with various types of welding operations and in various places. The type of welder with which the ground clamp 10 is connected is absolutely immaterial, and the same holds true for the type of welding being performed i.e. in the field, in the shop, etc.

Ground clamp 10 is made of an elongate cylindrical housing or sleeve 12 having a cylindrical side wall 14 and an end wall 16. The opposite end of housing 14 is open and contains a packing gland 18 of conventional packing material. A transverse partition 20 is in housing 14 and has a central aperture 22 through which rotatable stud 24 extends. The packing gland or packing 18 has a cylindrical bore 26 through which stud 24 extends, and there is an assembly 28 for tightening the packing 18 against the surface of stud 24. Assembly 28 consists of a collar 30 having a beveled inner face 32 abutting the outer edge of the packing 18. A cap nut 34 is fixed to the collar 30 and has a skirt 36 which is internally threaded to engage the external threads 38 on the open end portion of cylindrical side wall 14. Therefore, the packing 18 may be compressed by simply finger tightening assembly 28 thereby compressing packing 18 against partition 20 and also against the surface of stud 24.

A pool or quantity of mercury 40 is maintained in the cavity of the cylindrical housing on one side of the partition 20. Filler neck 42 is attached to housing side wall 14 and has a closure cap 44 thereon in order to fill the mercury cavity. The mercury assures that there will be electrical continuity between stud 28 and the housing 12. An ear 46 is fixed to side wall 14 and has a hole 48 therein to receive binding post 50. The binding post may be in the form of a bolt supporting the welding cable 52.

Stud 24 is capable of rotating within the housing and is capable of limited axial movement. In order to prevent the stud 24 from pulling out of the housing there is a washer 56 mounted on the surface of stud 24 and disposed in the mercury cavity. A cotter pin 58 is passed through aligned openings in washer 56 and in the stud 24 whereby the stud 24 is capable of free rotational movement but capable of only a limited axial movement.

Figure 2:
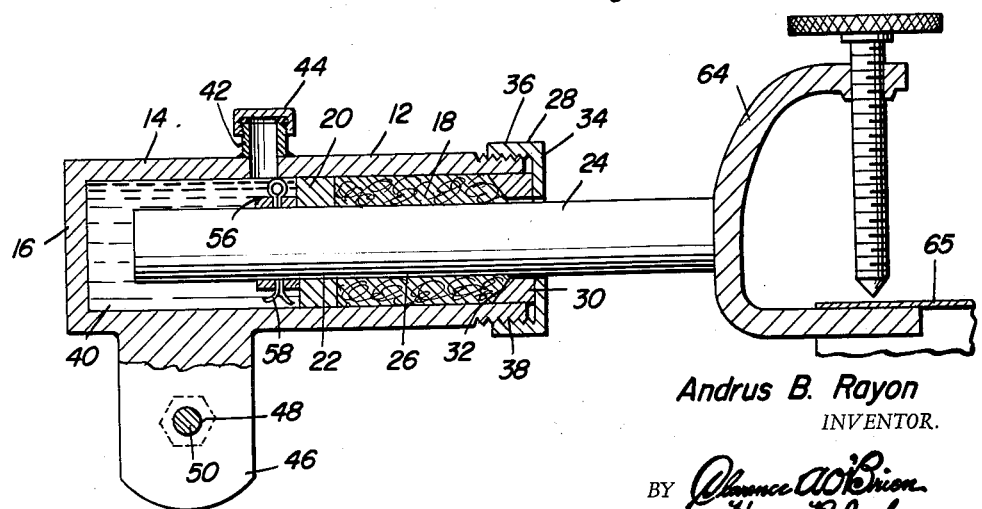
FIGURE 2 is a sectional view taken on the line 2—2 of FIGURE 1.

Work engaging means are carried by stud 24 on the exterior of housing 12. The work engaging means illustrated are merely a C-clamp 64 and in FIGURE 2, the C-clamp is shown connected with a part 65 of a thin walled tubing. The type of workpiece selected is, of course, immaterial, and for all practical purposes, C-clamp 64 is conventional. However it is to be particularly noted that the C-clamp 64, being conventional, is freely interchangeable between other types of clamps including a magnet, an alligator clip and many others.

In use, the clamp 64 is engaged with the workpiece and this automatically places the ground clamp 10 in its operative arrangement. The workpiece is capable of rotation with reference to housing 12 and the more usual situation, the housing 12 is freely rotatable with reference to the workpiece inasmuch as housing 12 can rotate with respect to stud 24. During all movements, however, an excellent electrical ground is maintained due to the presence of mercury 40.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be restorted to, falling within the scope of the invention as claimed.

What is claimed as new is as follows:

A ground clamp for welders, said ground clamp comprising an elongated hollow sleeve closed at one end and open at the other end, a rigid transverse partition in said sleeve, a stud longitudinally disposed in said sleeve and having one end projecting outwardly of the open end of said sleeve, said partition having an aperture formed therein through which the other, inner end of said stud extends and is rotatably journaled, said partition subdividing said sleeve into a pair of cavities, mercury contained in the innermost cavity between said partition and closed end of said sleeve to establish an electrical continuity between the stud and the housing, a packing gland in the other of said cavities between said partition and said open end of said sleeve and about said stud, means connected with said housing and engaging said packing gland for compressing the packing gland against the surface of the stud to prevent leakage, said compressing means including means journaling the outer end of said stud a spaced distance from said partition, a clamp member on the outer end of said stud adapted to engage a workpiece, means carried by said sleeve adapted to rigidly secure one end of a ground cable thereto, and stop means carried by the inner end of said stud and engageable with said partition for limiting outward movement of said stud from said open end of said sleeve, a filler opening in said sleeve communicating with said innermost cavity provided with a removable closure cap for filling the innermost cavity with mercury, said stop means comprising an annular stop washer disposed about the innermost end of said stud in said innermost partition, a retaining pin removably secured through said stop washer and said stud removably securing said stop washer on said stud, said retaining pin being registrable with said filler opening and removable therethrough.

References Cited in the file of this patent

UNITED STATES PATENTS

| | | |
|---|---|---|
| 2,424,545 | Bard | July 29, 1947 |
| 2,632,068 | Froebel et al. | Mar. 17, 1953 |

FOREIGN PATENTS

| | | |
|---|---|---|
| 3,478 | Great Britain | July 14, 1883 |
| 161,707 | Sweden | Dec. 17, 1957 |